United States Patent
Bongers

Patent Number: 5,823,903
Date of Patent: Oct. 20, 1998

[54] PULLEY

[75] Inventor: Sebastiaan Pieter Henricus Jozef Bongers, Nijmegen, Netherlands

[73] Assignee: Van Doorne's Transmissie B.V., AM Tilburg, Netherlands

[21] Appl. No.: 552,114

[22] Filed: Nov. 2, 1995

[30] Foreign Application Priority Data

Nov. 10, 1994 [NL] Netherlands ............... 9401877

[51] Int. Cl.⁶ ............................................. F16H 9/12
[52] U.S. Cl. .................................. 474/25; 384/275
[58] Field of Search ..................... 474/19, 25, 28–30, 474/70, 138; 384/275, 296

[56] References Cited

U.S. PATENT DOCUMENTS

| | | | |
|---|---|---|---|
| 4,405,028 | 9/1983 | Price | 180/65 E |
| 4,650,442 | 3/1987 | Parsons | 474/29 |
| 4,735,598 | 4/1988 | Moroto et al. | 474/29 |

FOREIGN PATENT DOCUMENTS

| | | |
|---|---|---|
| 2727040 | 12/1977 | Germany . |
| 4305102 | 8/1994 | Germany . |

Primary Examiner—Roger J. Schoeppel
Attorney, Agent, or Firm—Greenblum & Bernstein, P.L.C.

[57] ABSTRACT

The invention relates to a pulley, in particular for a continuously variable transmission, provided with two sheaves on a pulley shaft, the sheaves being non-rotationally fixable on the pulley shaft, and at least one sheave being axially movable relative to the pulley shaft by means of movement means.

According to the invention, the movable sheave is placed on the pulley shaft in such a way that, if the movement means impose a stable position on the sheave, the sheave is fixed axially relative to the pulley shaft and that, if the movement means impose a change in the axial position of the sheave, the sheave is movable in the axial direction and/or in the direction of rotation relative to the pulley shaft.

17 Claims, 3 Drawing Sheets

PULLEY

BACKGROUND OF THE INVENTION

1. Field of the Invention

The invention relates to a pulley, in particular for a continuously variable transmission, provided with two sheaves on a pulley shaft, the sheaves being non-rotationally fixable on the pulley shaft, and at least one sheave being axially movable relative to the pulley shaft by means of movement means.

2. Description of the Relevant Materials

Such a pulley is known from German Offenlegungsschrift 43.05.102 and is used in particular in continuously variable transmissions, for example for vehicles. A drive belt can be fitted between two pulleys, and an infinite number of transmission ratios can be set through variation of the radial positions of the drive belt. The variation in the radial position of the drive belt is achieved by varying the axial position of the axially movable sheave by means of the movement means. For this purpose, the sheave must, on the one hand, be placed in such a way that it is axially slidable on the pulley shaft and, on the other hand, in order to be able to transmit torque, must be fixed in the direction of rotation relative to the pulley shaft. A non-rotational, but axially free placing of a sheave on the pulley shaft is possible, for example, by means of groove/tooth connections or, as in the case of the known pulley according to German Offenlegungsschrift 43.05.102, by means of ball/groove connections. However, these known connections are expensive and complicated, on account of the large number of parts and the accurate machining operations, and they require a large amount of fitting space both in the axial and in the radial direction.

SUMMARY OF THE INVENTION

The object of the invention is to overcome the disadvantages outlined and to provide a simple, relatively cheap pulley which requires only limited fitting space. To this end, the pulley according to the invention is characterized in that at least the movable sheave is placed on the pulley shaft in such a way that, if the movement means impose a stable axial position on the sheave, the sheave is fixed axially relative to the pulley shaft and that, if the movement means impose a change in the axial position on the sheave, the sheave is movable in the axial direction and/or in the direction of rotation relative to the pulley shaft. Owing to the fact that, if a stable axial position is desired, the sheave is fixed axially relative to the pulley shaft, and the sheave is movable only in the axial direction and/or in the direction of rotation relative to the pulley shaft if a change is desired in the position of the sheave, a simple, relatively cheap pulley with a limited fitting space is obtained. Moreover, in the stable axial position the sheave is axially fixed not only by the movement means, but also by the placing of the sheave on the shaft itself. The support of the sheave is optimized in this way.

According to a further development of the invention, the sheave is placed tiltably on the pulley shaft. Such a design is particularly advantageous because few or no parts, critical machining operations and assembly operations are needed, and a very limited fitting space is obtained. The sheave of the pulley according to the invention can comprise a collar extending axially over the pulley shaft. In this case the collar can in particular support and reinforce the tilting effect. At least at the end of the collar at least the edges of the collar adjoining the pulley shaft can be profiled, in particular rounded. The contact stresses can be limited in this way. The end of the collar according to the invention can be adjustably connected to the rest of the collar, for example by means of an elastic hinge, so that the contact between the collar and the shaft is optimized.

The invention also makes it possible to provide the pulley shaft and/or the sheave and/or the collar with one or more contact rings. Through a suitable choice of material for these contact rings, the various contacts can be optimized according to their type. In particular, for this purpose, a contact ring can be connected in a self-adjusting manner to the sheave or the collar thereof.

One or more contact faces, of the contact rings or otherwise, can be hardened and/or can be provided with a suitable surface texture, in order in this way to obtain good wear resistance and to support the relative movements of the various parts. By giving the surface texture a greater coefficient of friction in the peripheral direction than axially, a relative movement of the sheave in the direction of rotation is subordinated to a relative movement in the axial direction.

The sheave and/or the collar thereof are preferably placed with narrow tolerance on the pulley shaft. This prevents leakage of fluid under pressure between the sheave and the pulley shaft, and also limits an angular deviation of the sheave flank. This angular deviation of the sheave flank, inter alia as the result of tilting, can be overcome according to the invention through correction of the flank angle of the sheave, in particular by comparison with the flank angle of a fixed sheave.

The invention also relates to a continuously variable transmission provided with a pulley according to the invention.

BRIEF DESCRIPTION OF THE DRAWINGS

The invention will be explained with reference to a drawing, in which.

DETAILED DESCRIPTION OF THE PREFERRED EMBODIMENT

Figure 1:
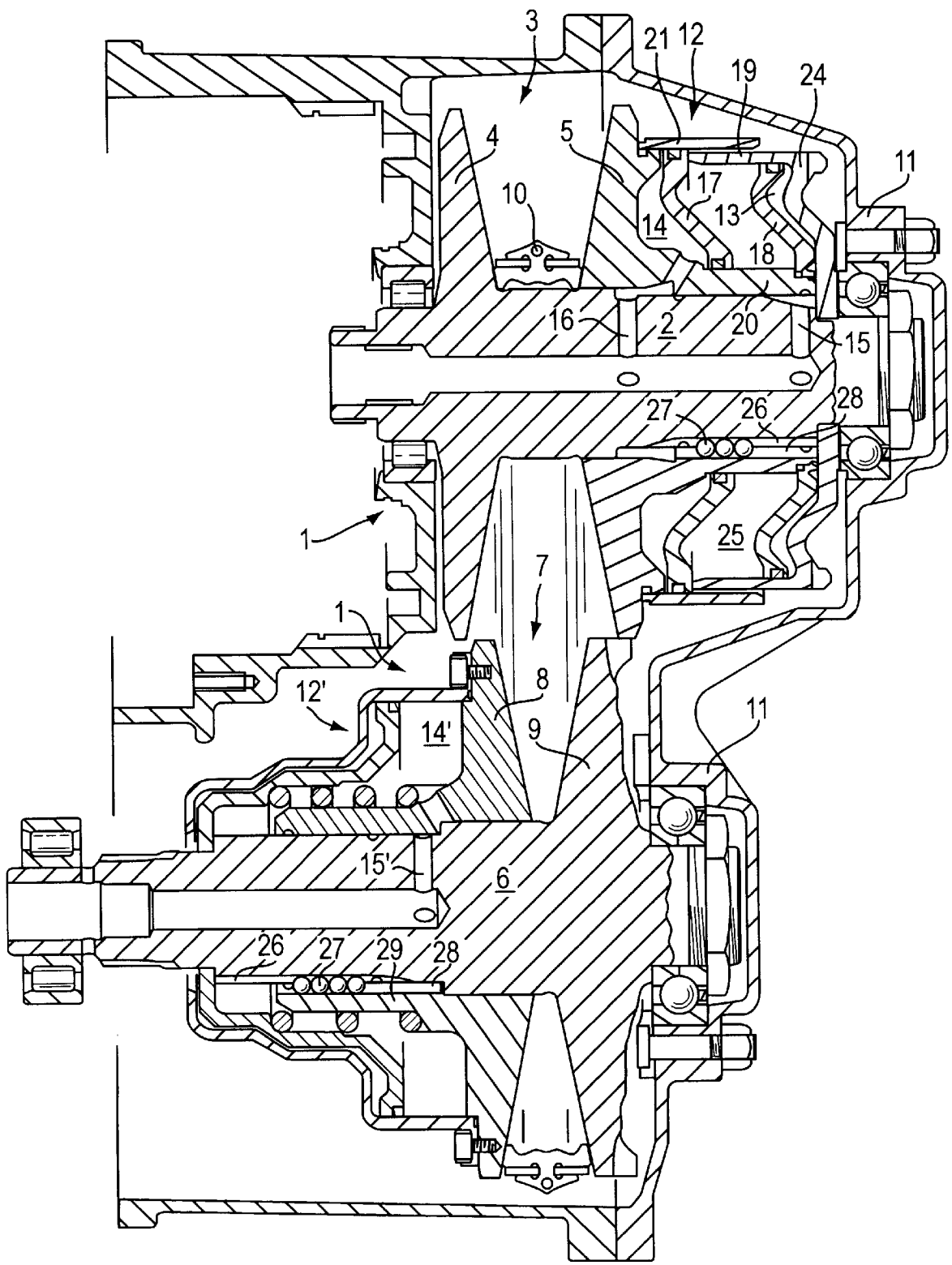
FIG. 1 shows a continuously variable transmission in cross-section and provided with pulleys according to the prior art.

FIG. 1 shows diagrammatically a continuously variable transmission 1 with pulleys 3 and 7 according to the prior art and fixed in transmission housing 11. The primary pulley 3 comprises the sheaves 4 and 5 on a primary shaft 2. The secondary pulley 7 comprises the sheaves 8 and 9 on a secondary shaft 6. The sheaves 5 and 8 are disposed movably on the pulley shafts 2 and 6 respectively.

The axially movable sheave 5 has piston-cylinder means 12 with a pressure chamber 14 and a second pressure chamber 13. The chamber 25 is pressureless. Fluid under pressure is supplied and discharged through suitable passages 15 and 16, in this case to and from the two chambers 13 and 14, in order to influence the axial position of sheave 5 in this way. The pressure chamber 13 has essentially radially directed walls 18 and 24, and also wall 19 and shaft 2. Wall 17 is slidable between wall 20 and cylindrical wall 21 of the sheave 5. Wall 17 also rests against wall 19, so that the assembly 17, 19, 24 acts both as piston 17 and as cylinder 19, 24. Wall 18 at its one end rests slidably on wall 19 and at its other end is immovably fixed on wall 20 of the sheave 5 in this embodiment. The axially movable sheave 8 of pulley 7 has piston/cylinder means 12', which enclose one pressure chamber 14' which is supplied through passage 15'.

A drive belt 10 is passed around the pulleys 3 and 7, and the ratio of the radial positions of the drive belt between the pulleys 3 and 7 determines the transmission ratio. These radial positions are variable and depend on the axial positions of the axially movable sheaves 5 and 8. In what follows it is assumed that the way in which the continuously variable transmission 1 works is otherwise known.

In order to permit, on the one hand, torque transmission from pulley shaft 2 to the sheaves 4 and 5 and, on the other hand, from the sheaves 8 and 9 to the pulley shaft 6, while torque transmission takes place between the pulleys 3 and 7 by means of the drive belt 10, the sheaves 4, 5, 8 and 9 must be disposed in an essentially non-rotational manner on the pulley shafts 2 and 6. The sheaves 5 and 8 must, however, be axially movable, in order to permit setting of the transmission ratio. In order to permit non-rotational positioning of the sheaves on the pulley shafts, combined with the ability of the sheaves to move axially relative to the pulley shafts, ball grooves 26 are provided in the pulley shafts 2 and 6. These ball grooves 26 contain balls 27, which in turn extend into ball grooves 28 in walls 20 and 29 of the sheaves 5 and 8 respectively. Apart from that, a corresponding non-rotational, but axially free positioning of the sheaves 5 and 8 can be produced with groove/tooth connections instead of with ball/groove connections. Both connections require additional parts, accurate machining operations and additional assembly operations. These connections are consequently expensive and complicated. Besides, a considerable fitting space is required both in the axial and in the radial direction, not only for the accommodation of (sufficient) balls, but also for machining the ball tracks or grooves. The grooves or ball tracks also weaken the pulley shafts in an adverse way.

Figure 2A:
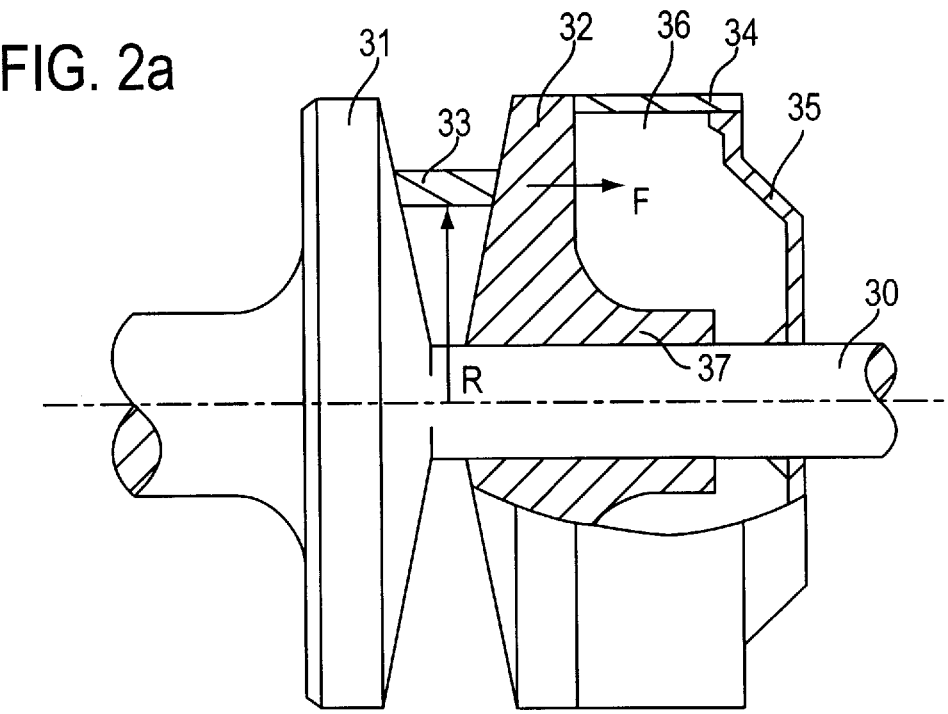
FIG. 2a shows a diagrammatically illustrated embodiment of a pulley according to the invention, partially in cross-section.

The embodiment of the pulley according to the invention shown diagrammatically in FIG. 2a comprises a sheave 31, immovably fixed on the pulley shaft 30, and an axially movable sheave 32. The sheave 32 is again movable in a known manner by means of the movement means 34, 35. The movement means with the cylinder 34 fixed on the sheave and the piston 35 fixed on the shaft enclose a chamber 36 which can be provided with fluid in a manner not shown. A drive belt 33 is situated between the sheaves 31 and 32.

The sheave 32, which also comprises a collar 37 projecting partially over the pulley shaft 30, according to the invention is placed tiltably on the pulley shaft 30.

Figure 2B:
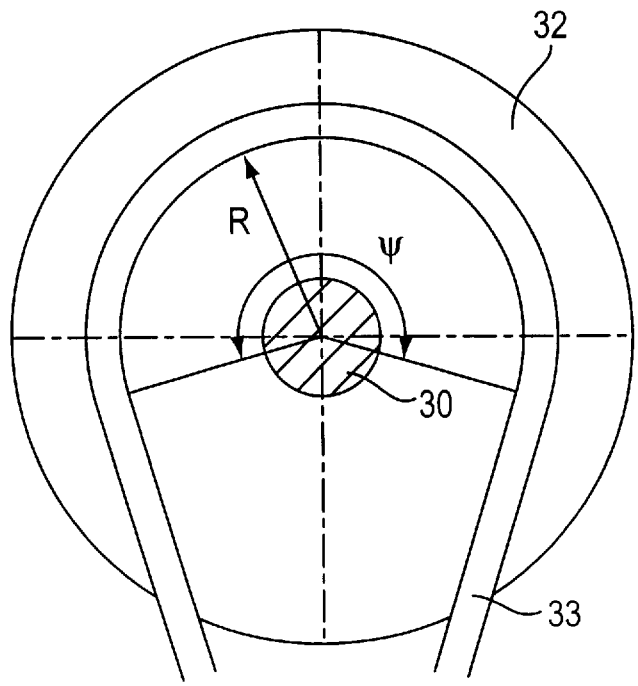
FIG. 2b shows a diagrammatic radial view of a pulley/drive belt assembly.
Figure 3A:
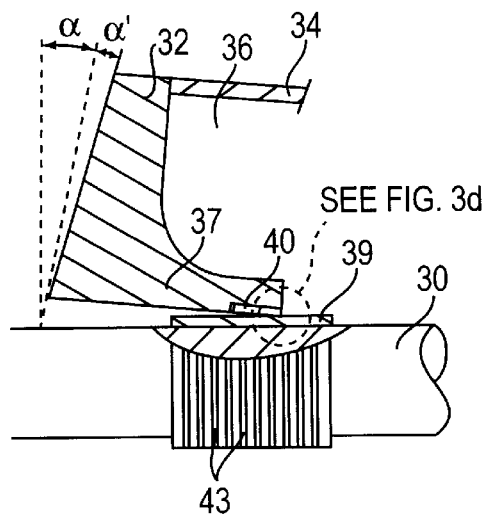
FIG. 3a shows a diagrammatically illustrated sheave on a pulley shaft with contact rings with an enlarged portion therof being illustrated in FIG. 3d.
Figure 3D:
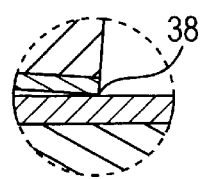
FIG. 3b shows a diagrammatically illustrated sheave on a pulley shaft with a slipper.
FIG. 3c shows a diagrammatically illustrated sheave on a pulley shaft provided with a collar having an elastic hinge.

Since, as shown in FIG. 2b, the drive belt 33 is in contact with the sheave 32 only over a limited segment $\Psi$ of a circle, the drive belt 33 will exert an eccentric force F on the sheave 32, which will cause the sheave to tilt relative to the pulley shaft 30. This is shown in a rather extreme way in FIG. 3a. Through this tilting, the sheave 32 is fixed relative to the pulley shaft 30 at the position of edge 38 of collar 37. This means that the sheave 32 is fixed both in the direction of rotation and in the axial direction so long as the movement means 34, 35 impose a stable axial position on the sheave.

As soon as the movement means 34, 35 do impose an axial movement on the sheave, by conveying fluid to or from the chamber 36, the forces equilibrium between the force F exerted by the drive belt, the pressure in chamber 36 and the tilting force at the position of the edge 38 of the collar 37 of sheave 32 is disturbed, and the sheave 32 will seek a new point of equilibrium for this play of forces. The edge 38 of the collar 37 of the sheave 32 will in this case glide and/or roll over the pulley shaft 30. This rolling occurs through the constant movement in the peripheral direction of the eccentric application point of the resulting force F of the drive belt 33 on the sheave 32. It has been found that the sheave 32 rotates little if at all relative to the pulley shaft 30 during the abovementioned gliding or rolling, so that a non-rotational connection relative to the pulley shaft 30 is retained.

Figure 3B:
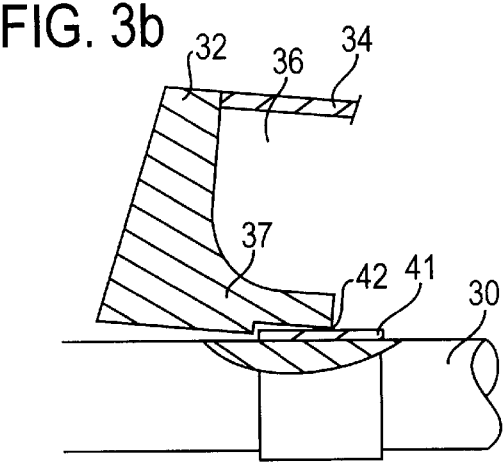

Through the tilting, Hertzian stresses can occur at the position of edge 38 of the collar 37 and the contact point thereof with the shaft 30, which stresses can be limited through the edge 38 being rounded. The pulley shaft 30 is also provided with a contact ring 39, and the collar 37 is provided with a contact ring 40, the edge of which is rounded. Through the use of these contact rings 39 and 40, the contact can be optimized between the collar 37 and the shaft 30. This means that the wear of the contact faces can be limited through a suitable choice of material. The choice of material for the sheave 32, the collar 37 and the pulley shaft 30 is thus not influenced by the specific desired properties in the contact faces. In particular, the contact faces, in this case the contact rings 39 and 40, are hardened. The contact between the collar 37 and the pulley shaft 30 is further optimized by connecting the contact ring 41 in a self-adjusting manner to collar 37 by means of an elastic hinge 42, as shown in FIG. 3b, which in particular results in lower Hertzian stresses.

Figure 3C:
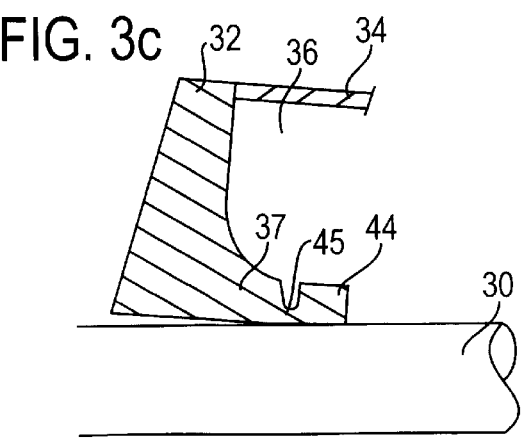

Another embodiment thereof is shown in FIG. 3c, in which the collar 37 is provided with a notch 45, by means of which the end 44 of the collar can pivot slightly relative to the remainder of the collar 37 and can adjust in the optimum manner. The notch 45 in this case functions as an elastic hinge.

The gliding and rolling of the sheave 32 and/or the collar 37 thereof over the pulley shaft 30 can also be influenced in a suitable way by providing the contact faces, such as the contact rings 39 and 40, with a suitable surface texture. For example, contact ring 39 is provided with peripheral grooves 43. A surface texture with a coefficient of friction which is greater in the peripheral direction than in the axial direction ensures that, although the sheave is movable in a tilting manner in the axial direction, rotation of the sheave 32 relative to the pulley shaft 30 is not possible, or is possible only to a very limited extent.

The tilting and the gliding and rolling of the sheave 32 on the pulley shaft 30 can be optimized not only through the use of contact rings, the suitable application of a surface texture and an appropriate choice of material, but also through choosing an appropriate length of the collar 37.

The tilting of the sheave 32 produces a deviation $\alpha'$ on the flank angle of the sheave. This deviation $\alpha'$ can be corrected by giving the sheave a corrected flank angle, for example $\alpha-\alpha'$.

At the position of the sheave 32 and the collar 37 bores for the supply and discharge of fluid, for example for the movement means 34, 35, can be provided in the pulley shaft 30. The tilting will mean that these bores will not be sealed so well by, for example, the collar 37 on the pulley shaft 30, but this can be overcome by placing the sheave 32 and/or the collar 37 with narrow tolerance on the pulley shaft 30.

After the above it will be clear that the invention provides a relatively cheap and simple pulley, because few or no additional parts are needed, and expensive and critical machining operations can be avoided. Furthermore, the pulley does not require any additional fitting space in either the radial or the axial direction. It will be clear that within the inventive idea many more embodiments which are considered to form part of the invention are conceivable.

For example, in the case of a pulley which is provided in the known manner with a piston/cylinder assembly the collar 37 also enclosing the cylinder can be provided with means for partially shutting off the collar from fluid. The distribution of forces on the sheave can be influenced in such a way by this that in a desired movement of the sheave the tilting effect is temporarily suppressed slightly, with the result that the gliding and rolling is promoted.

What is claimed is:

1. A pulley adapted for use with a continuously variable transmission, comprising:

a pulley shaft having an axial direction and a rotational direction;

a first sheave fixed in said axial and rotational directions with respect to said pulley shaft;

a second sheave movable in said axial direction with respect to said pulley shaft, said first sheave and said second sheave accommodating a drive belt therebetween; and a movement mechanism that exerts axial pressure on said second sheave to move the second sheave in said axial direction to a stable axial position, thereby inducing a reaction force from the drive belt, wherein, when said movement mechanism imposes a stable axial position on said second sheave, the reaction force and the axial pressure form a moment that engages said second sheave to said pulley shaft and rotationally fixes said second sheave relative to said pulley shaft, so that said pulley shaft is adapted to transmit torque to the drive belt or receive torque from the drive belt.

2. The pulley according to claim 1, wherein the second sheave is tiltably positioned on the pulley shaft.

3. The pulley according to claim 1, wherein the second sheave comprises a collar extending axially over the pulley shaft.

4. The pulley according to claim 3, wherein at least at an end of the collar at least edges of the collar adjoining the pulley shaft are profiled.

5. The pulley according to claim 3, wherein an end of the collar is adjustably connected to a remaining portion of the collar.

6. The pulley according to claim 5, wherein the end of the collar is adjustably connected to a remaining portion of the collar by means of an elastic hinge.

7. The pulley according to claim 1, wherein at least one of the pulley shaft, the second sheave, and the collar include at least one contact ring.

8. The pulley according to claim 7, wherein said at least one contact ring is connected in a self-adjusting manner to the second sheave or the collar.

9. The pulley according to claim 1, wherein at least one contact face is hardened.

10. The pulley according to claim 1, wherein at least one contact face includes a surface texture.

11. The pulley according to claim 10, wherein the surface texture has a greater coefficient of friction in a peripheral direction than axially.

12. The pulley according to claim 1, wherein at least one of the second sheave and the collar is placed with narrow tolerance on the pulley shaft.

13. The pulley according to claim 1, wherein the axially movable second sheave has a flank angle corrected for tilting effect.

14. A continuously variable transmission provided with a pulley according to claim 1.

15. The pulley according to claim 3, wherein at least at an end of the collar at least edges of the collar adjoining the pulley shaft are rounded.

16. The pulley according to claim 1, wherein the axially movable second sheave has a flank angle corrected for tilting effect by comparison with the flank angle of a fixed sheave.

17. A pulley, in particular for a continuously variable transmission, comprising two sheaves on a pulley shaft, between which sheaves a drive belt can be accommodated, said sheaves being substantially non-rotationally fixable on the pulley shaft, one of said sheaves being axially fixed relative to said pulley shaft, and the other sheave being axially movable relative to said pulley shaft and capable of exerting, via an axial pressure received from means for moving said axially movable sheave, a torque transmission force on said drive belt, or of receiving a torque transmission force from said drive belt, wherein said axially movable sheave is positioned on said pulley shaft, without locking means for locking rotational movement between said axially movable sheave and said pulley shaft, in such a way that, if said means for moving impose a stable axial position on said axially movable sheave, said axially movable sheave is fixed rotationally relative to said pulley shaft, thereby utilizing an influence of reaction forces between said pulley shaft and said axially movable sheave, with the reaction forces resulting from the force exerted on the drive belt.

* * * * *